Aug. 23, 1927.

T. V. BUCKWALTER 1,640,179

RAILWAY CAR TRUCK

Filed March 4, 1926

2 Sheets-Sheet 1

INVENTOR:-
Tracy V. Buckwalter,
by Carr & Carr,
HIS ATTORNEYS.

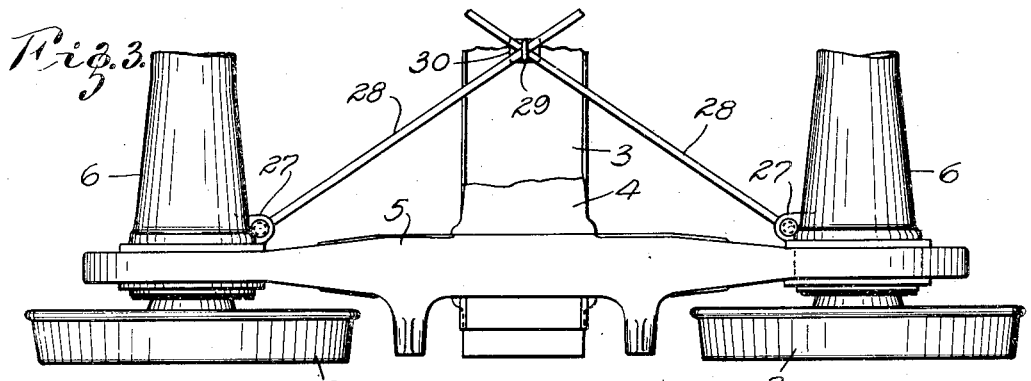
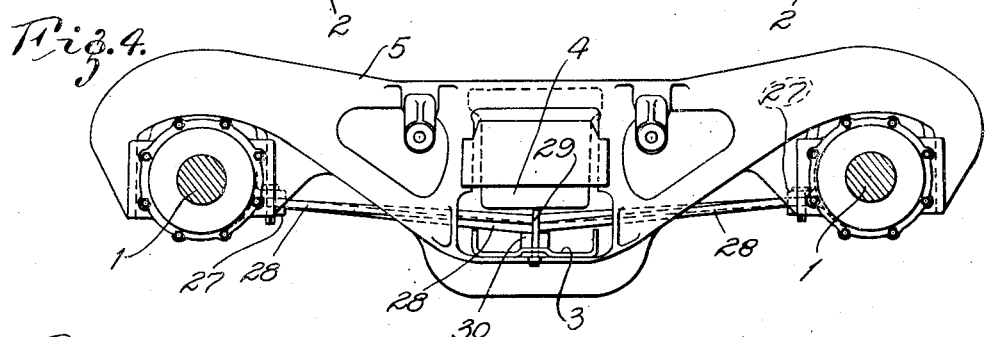
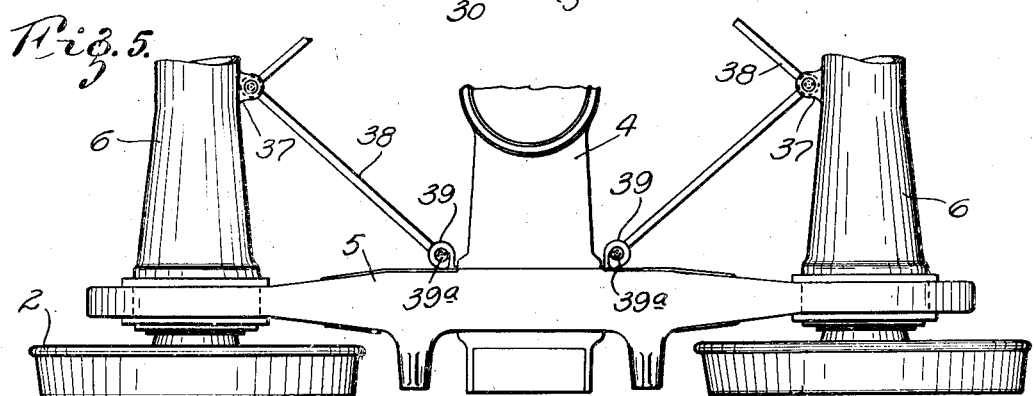
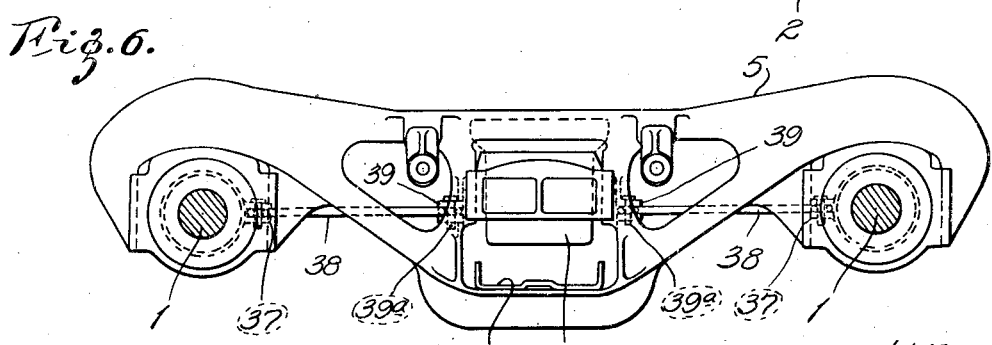

Patented Aug. 23, 1927.

1,640,179

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

RAILWAY-CAR TRUCK.

Application filed March 4, 1926. Serial No. 92,124.

My invention relates to railway car trucks and has for its principal object a truck in which the axles and the car wheels are maintained in alinement. A further object is to provide simple and effective means for bracing such car trucks against misalinement.

In the car truck constructions commonly used, the truck side frames are located outside of the wheels and said side frames are relied upon to maintain parallelism of the axle members and proper alinement of the wheels. Such constructions are not always effective for the purpose. According to the present invention the axle-housings are provided with tie-rods or brace members that are secured thereto at one end and that extend diagonally and are secured at their other ends to a suitable portion of the car truck, the truck side frames being preferably located between the wheels. The invention further consists in the car truck and in the parts and combinations and arrangements of parts hereinafter described and claimed.

Figure 1:
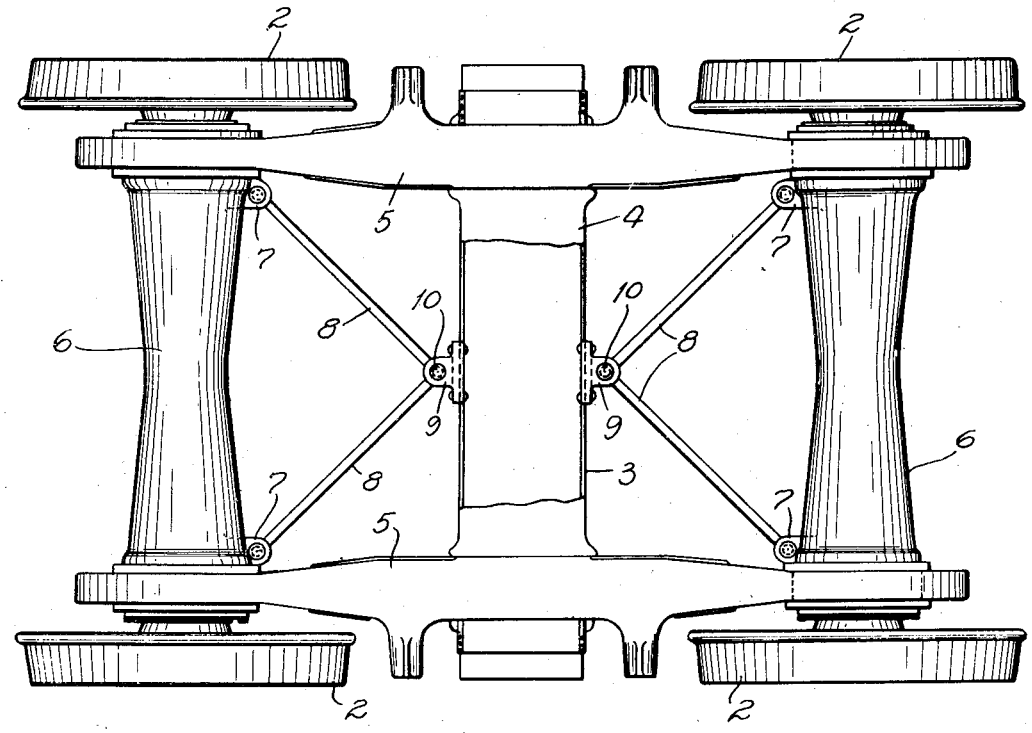
Figure 2:
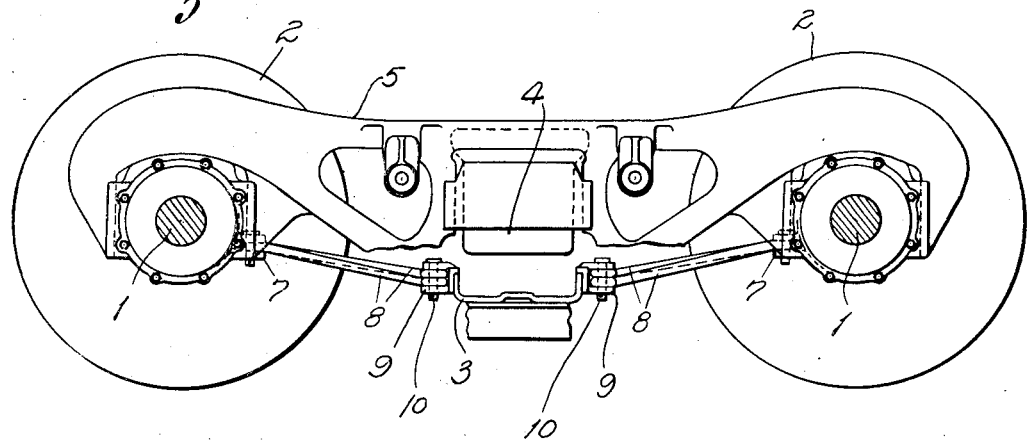

In the accompanying drawing, which forms part of the specification, and wherein like reference characters indicate like parts in several views, Fig. 1 is a plan view of a railway car truck embodying my invention, portions of the bolster being broken away so that the invention may be more clearly shown, Fig. 2 is a side elevation of the construction shown in Fig. 1, a portion of the side frame being broken away and the axle members shown in section, Fig. 3 is a part plan view of a modified form of the invention, Fig. 4 is a side elevation of the construction shown in Fig. 3, the axle members being shown in section, Fig. 5 is a part plan view of another modification and Fig. 6 is an elevation of the construction shown in Fig. 5, the axle members being shown in section.

Railway car trucks in common use comprise a pair of axles 1, each having a wheel 2 at each end thereof, a spring plank 3, a bolster 4 and truck side frames 5 connecting the corresponding ends of the two axles 1. The constructions illustrated in the drawings are of the type wherein the axles 1 are enclosed in housing members 6 (anti-friction bearings, such as conical roller-bearings, being commonly interposed between the axles and the axle-housings) and the truck side frames 5 are secured to the end portions of the axle housings 6 (usually over the anti-friction bearings, if such bearings are used). The truck side frames 5 are thus located between the wheels 2 instead of outside of the wheels as is common practice.

It is desirable to maintain the axles 1 and axle-housings 6 in alinement, that is parallel to each other, and also to maintain the wheels 2 in alinement; and the present invention discloses constructions adapted, tie-rods or the like are used to maintain such alinement of the parts.

In the construction shown in Fig. 1 and Fig. 2, the axle housings 6 are provided with projecting lugs 7 near their ends. Such lugs may be bifurcated and between the jaws of each lug is secured one end of a tie-rod 8 that extends diagonally from the axle housing 6 toward the middle portion of the spring plank 3, where it is secured to a bracket 9 that is mounted on said spring plank 3. Preferably the bracket 9 is bifurcated and the ends of the tie-rods 8 are disposed between the jaws of the bracket 9 and secured to a bolt 10 or the like extending through said jaws and secured thereto.

In the construction shown in Figures 3 and 4, tie-rods 28 are secured at their ends between the jaws of bifurcated lugs 27 projecting from the ends of each axle housing 6. Each rod 28 extends diagonally to the opposite end of the opposite axle-housing 6, the two rods crossing at the center of the truck just above the spring plank 3 and below the bolster 4. At their intersection the rods 28 are secured together and to the spring plank by means of a U-bolt 29 and a block 30 interposed between the spring plank 3 and the lowermost tie-rod 28.

In the construction shown in Fig. 5 and Fig. 6, a V-shaped tie-rod 38 is secured at its crotch to a lug 37 or bifurcated bracket at the middle of each housing 6 and the two arms of each tie-rod 38 extend diagonally to the truck side frames 5 and the end portions of said rods 38 are secured to brackets 39 projecting from said truck side frame under the bolster. Said brackets may be bifurcated and the tie-rods secured between the jaws thereof as by a bolt 39ª or the like.

The above described constructions maintain parallelism between the axle members and maintain the wheels in alinement. Being located between the wheels, they do not interfere with inspection, adjustment and repair of the wheels, brakes and bearings. They are strong and simple in construction. Obviously numerous changes may be made without departing from the invention and I do not wish to be limited to the precise constructions shown.

What I claim is:

1. A car truck construction comprising axles, axle housings and tie-rods secured to said axle housings and extending diagonally therefrom.

2. A car truck construction comprising axles, axle housings, and tie-rods secured to the ends of said axle housing and extending diagonally toward the center of the truck.

3. A car truck construction comprising axles, axle housings, tie-rods secured to the ends of said axle housing and extending diagonally toward the center of the truck and means for securing said tie-rods at the center of said truck.

4. A car truck construction comprising a pair of axles having wheels thereon, axle housings encasing said axles and terminating short of the wheels, truck side frames mounted on the ends of said axle housings and tie-rods secured to the ends of said axle housings and extending diagonally therefrom.

5. A car truck construction comprising a pair of axles having wheels thereon, axle housings encasing said axles and terminating short of the wheels, truck side frames mounted on the ends of said axle housings and diagonally extending tie-rods secured to said axle housings to maintain them and the wheels in alinement.

6. A car truck construction comprising a pair of axles, wheels thereon, axle housings, truck side frames mounted on the ends of said housings, a bolster mounted in said side frames, brackets on said axle housing near the ends thereof, a securing means on said bolster near the middle thereof, and tie rods secured to said brackets on said axle housing and to said securing means on said bolster.

7. A car truck construction comprising a pair of axles, wheels thereon, axle housings, truck side frames mounted on the ends of said axle housings, a bolster mounted in said side frames, brackets on said axle housing near the ends thereof, a bracket on either side of said bolster at the middle thereof and tie-rods secured to said brackets on said housings and said bolster.

8. A car truck construction comprising axles, axle housings, truck side frames extending from axle housing to axle housing and tie rods secured to the middle portions of said axle housings and to said side frames.

9. A car truck construction comprising axles, axle housings, truck side frames extending from axle housing to axle housing, a bolster mounted in said side frames, said axle housings being provided with brackets at their middle portions, said side frames being provided with brackets on either side of said bolster and tie rods secured to said brackets on said housings and side frames.

Signed at Canton, Ohio, this 23d day of Jan., 1926.

TRACY V. BUCKWALTER.